United States Patent Office.

WILLIAM WHITNEY, OF GOUVERNEUR, NEW YORK.

ALTERATIVE TONIC.

SPECIFICATION forming part of Letters Patent No. 378,156, dated February 21, 1888.

Application filed June 3, 1887. Serial No. 240,128. (No specimens.)

*To all whom it may concern:*

Be it known that I, WILLIAM WHITNEY, a citizen of the United States, residing at Gouverneur, in the county of St. Lawrence and State of New York, have invented a new and useful composition of matter to be used as a medicine for the treatment of liver complaint, cankered mouth, cankered stomach, erysipelas, salt-rheum, dyspepsia, rheumatism, piles, itching or burning sensations of the skin, acne or pimples on the face, loss of appetite, and diseases of the blood, skin, or scalp, of which the following is a specification.

Virginia snake-root, (*Serpentaria*,) mezereon-bark, (*Daphne mezereum*,) frost-wort, (*Helianthemum canadense*,) guaiacum-chips, (*Guaiacum officinale*,) and prince's-pine, (*Pipsissewa*,) of each six ounces; prickly-ash bark, (*Xanthoxylum frax.*,) tag-alder bark, (*Alnus rubra*,) sarsaparilla-root, Honduras, (*Smilax officinalis*,) burdock-root, (*Lappa minor*,) yellow-dock root, (*Rumex crispus*,) mandrake-root, (*Podophyllum peltatum*,) of each sixteen ounces. These, all ground to No. 40 fineness and mixed thoroughly together, put into a vessel of five gallons capacity and moisten with one gallon diluted alcohol, allowing it to stand for two days. Then transfer to a covered percolator and percolate with diluted alcohol until twenty-three and one-half (23½) quarts are obtained. Now dissolve six ounces iodide of potassium in six ounces liquor potassa and add to the percolate, agitating until the iodide is thoroughly dissolved. No more than twelve pints of alcohol will be used in the above. If any lack should occur in making the above amount of percolate—viz., twenty-three and one-half quarts—water is to be added until it is obtained. Lastly, dissolve by agitation five pounds fine granulated sugar in the liquid. Let it stand for two days and bottle.

The directions for using the above compound are as follows: One-half to one table-spoonful three times a day, during or immediately after meals.

I am not aware that all the ingredients of my composition in the proportions stated have been used together.

What I claim, and desire to secure by Letters Patent of the United States, is—

The herein-described composition of matter to be used as a medicine, as above prescribed, consisting of Virginia snake-root, mezereon-bark, frost-wort, guaiacum-chips, prince's-pine, prickly-ash, tag-alder bark, sarsaparilla-root, burdock-root, yellow-dock root, mandrake-root, iodide of potassium, liquor potassa, sugar, alcohol, and water, in the proportions specified.

Dated May 31, 1887.

WM. WHITNEY.

Witnesses:
CHAS. P. HOLMES,
GEORGE W. SELLERS.